United States Patent
Humphrey et al.

(10) Patent No.: US 7,178,103 B2
(45) Date of Patent: Feb. 13, 2007

(54) SYSTEMS AND METHODS FOR STORING CONFIGURATION DATA IN PROCESS CONTROL SYSTEMS

(75) Inventors: Douglas Humphrey, Milton, MA (US); Katherine M. Wallace, Norton, MA (US); Nancy A. Nunes, Cumberland, RI (US)

(73) Assignee: Invensys Systems, Inc., Foxboro, MA (US)

( * ) Notice: Subject to any disclaimer, the term of this patent is extended or adjusted under 35 U.S.C. 154(b) by 458 days.

(21) Appl. No.: 10/770,997

(22) Filed: Feb. 3, 2004

(65) Prior Publication Data

US 2005/0172220 A1  Aug. 4, 2005

(51) Int. Cl.
*G06F 15/00* (2006.01)

(52) U.S. Cl. ...................................... 715/513
(58) Field of Classification Search ............. 715/501.1, 715/513, 500
See application file for complete search history.

(56) References Cited

U.S. PATENT DOCUMENTS

| | | | |
|---|---|---|---|
| 5,978,850 A * | 11/1999 | Ramachandran et al. ... | 709/228 |
| 6,076,952 A * | 6/2000 | Gretta et al. ................... | 700/83 |
| 6,631,298 B1 * | 10/2003 | Pagnano et al. .............. | 700/19 |
| 6,683,553 B1 * | 1/2004 | Pai .............................. | 341/155 |
| 6,738,388 B1 * | 5/2004 | Stevenson et al. ........... | 370/465 |
| 7,010,362 B2 * | 3/2006 | Dove et al. ................... | 700/18 |
| 2002/0022894 A1 * | 2/2002 | Eryurek et al. ............... | 700/80 |
| 2002/0169804 A1 * | 11/2002 | Faist et al. ................... | 707/513 |
| 2004/0059851 A1 * | 3/2004 | Donaires ...................... | 710/104 |
| 2004/0230899 A1 * | 11/2004 | Pagnano et al. ............. | 715/513 |
| 2004/0243933 A1 * | 12/2004 | Becker et al. ............... | 715/513 |
| 2005/0172258 A1 * | 8/2005 | Nixon et al. ................. | 717/100 |
| 2005/0240286 A1 * | 10/2005 | Glanzer et al. ............... | 700/18 |
| 2006/0140209 A1 * | 6/2006 | Cassiolato et al. .......... | 370/466 |
| 2006/0142875 A1 * | 6/2006 | Keyes et al. .................... | 700/1 |
| 2006/0206218 A1 * | 9/2006 | Glanzer et al. ............... | 700/18 |

OTHER PUBLICATIONS

Avsec et al., The Design of the Control System for Anka, IEEE 1998, pp. 2481-2483.*
Buhler, The CANopen Markup Language—Representing Fieldbus Data with XML, IEEE 2000, pp. 2449-2454.*
Buhler, Remote Fieldbus System Management with Java and XML, IEEE 2000, pp. 1-6.*

* cited by examiner

*Primary Examiner*—Cong-Lac Huynh
(74) *Attorney, Agent, or Firm*—Foley Hoag LLP

(57) ABSTRACT

Systems and methods for storing configuration data for process control systems are described. In one embodiment, a method for storing configuration data for a Fieldbus device can include generating one or more first documents based on a first document type definition in a markup language, and generating one or more second documents based on a second document type definition in the markup language. The one or more first documents can include one or more block identifiers for identifying one or more function blocks associated with the Fieldbus device. The one or more second documents can be associated with the one or more function blocks and can include one or more parameter identifiers for identifying one or more parameters associated with the one or more function blocks.

44 Claims, 10 Drawing Sheets

```
<!ELEMENT ControllerDefinition (BlockDefinitionIdentifier+)>
    <!ATTLIST ControllerDefinition
        Name CDATA #REQUIRED
        Version CDATA #REQUIRED
    >
    <!ELEMENT BlockDefinitionIdentifier EMPTY>
    <!ATTLIST BlockDefinitionIdentifier
        Name CDATA #REQUIRED
        Version CDATA #REQUIRED
        Header CDATA #IMPLIED
        BlockFunction CDATA #IMPLIED
        ValidateFunction CDATA #IMPLIED
        DefinitionName CDATA #IMPLIED
    >
```

FIG. 1

```
                          ┌212        ┌240        ┌232
<!ELEMENT BlockDefinition (CPLoadInfo*, ParameterDefinitionName*)*>
   <!ATTLIST BlockDefinition           ┌214
      TypeName CDATA #REQUIRED ────┘
      Version CDATA #REQUIRED ─────── 216
      Header CDATA #REQUIRED ─────── 218
      ObjectType (IA | SEQ | StationBlock) "IA"  ⎫
      ObjectCategory CDATA #REQUIRED             ⎬ 220
   >                          ┌240
<!ELEMENT CPLoadInfo EMPTY>
   <!ATTLIST CPLoadInfo       ┌242
      CPType (AB30 | ABDH | AMC | AW70X | CP | C30 | CP3B | CP4B | CP40 |
CP60 | DP | FD30 | FDG | IG | IS30 | MG30 | MODG | OMC01 | SSG | TP)
#REQUIRED                               ┌244
      MemoryUsage CDATA #REQUIRED ────┘
      ExecutionTime CDATA #REQUIRED ─── 246
   >                          ┌232
<!ELEMENT ParameterDefinitionName (ExceptIn*)>
<!ATTLIST ParameterDefinitionName
      Name CDATA #IMPLIED ──── 234
      Order CDATA #IMPLIED ─── 236
>
<!ELEMENT ExceptIn EMPTY>
<!ATTLIST ExceptIn
      Name CDATA #REQUIRED
>

```
                                         312                         332                              300
<!ELEMENT BlockDefinition (CPLoadInfo*, ParameterDefinition*)*>
<!ATTLIST BlockDefinition
    TypeName CDATA #REQUIRED      314
    Header CDATA #REQUIRED           316
    Version CDATA #REQUIRED
    ObjectType (IA | SEQ | StationBlock) "IA"
    ObjectCategory CDATA #REQUIRED
>
<!ELEMENT CPLoadInfo EMPTY>
<!ATTLIST CPLoadInfo
    CPType (AB30 | ABDH | AMC | AW70X | CP | C30 | CP3B | CP4B | CP40 | CP60 | DP |
FD30 | FDG | IG | IS30 | MG30 | MODG | OMC01 | SSG | TP) #REQUIRED
    MemoryUsage CDATA #REQUIRED
    ExecutionTime CDATA #REQUIRED              340              350
>                                 332
<!ELEMENT ParameterDefinition (ExceptIn* | AtomicParameterDefinition | ArrayDefinition |
StructureDefinition)>            360
<!ATTLIST ParameterDefinition
    Name CDATA #IMPLIED    334
    Order CDATA #IMPLIED    336
    ParamName CDATA #IMPLIED    338
    StructMember CDATA #IMPLIED
>
<!ELEMENT ExceptIn EMPTY>
<!ATTLIST ExceptIn
    Name CDATA #REQUIRED     340
>
<!--Atomic Parameter Definition Element (child of Parameter Definition)-->
<!ELEMENT AtomicParameterDefinition EMPTY>
<!--ArrayDepth:    Size of the array. If it is not an array, ArrayDepth=1 -->
<!--Datatype:      Datatype the parameter will be declared as. -->
<!--Connectability: Defines whether the parameter is a source or a source and sink or neither --
>
<!--DefaultValue:  Value of the parameter when not otherwise set. -->
<!--LowRange:      Low Range the parameter can be set to (minimum characters if String).-->
<!--HighRange:     High Range the parameter can be set to (maximum characters if String).-->
<!--Configurable:  Parameter is able to be modified during configuration -->
<!--Description:   Description of the Parameter -->
<!--Private:       Parameter is internal to the Controller. -->
<!--Attributes
    Definition:    Name of parent block for this parameter
    Units:         Engineering units of parameter value (e.g., seconds, etc.)
    Groups:        Parameter group(s) parameter belongs to (e.g., Standard)
    Tooltip:       Tooltip displayed when editing parameter in property sheet
    Visible:       Parameter is visible to user during configuration
```

```
Editcontrol:       Type of control used to display/validate choicelist (e.g., listbox)
   Label:          Internationalizable label of parameter visible to user during configuration
   Format:         Printf string used to display parameter value
   CaseConversion: Determines whether parameter value is uppercase, or lowercase
   VersionDeleted: I/A Series version when parameter deleted from block
   VersionAdded:   I/A Series version when parameter added to block
   ValueFormula:   Formula used to determine parameter value
   Array:          Flag indicating whether or not parameter is an arrayed parameter
   BackCon:        Flag indicating whether or not parameter is back connectable
   HelpString:     String displayed when user requests help on that parameter
   Hidden:         Flag indicating whether or not parameter is hidden from view during
configuration
   Optional:       Flag indicating whether or not parameter value is optional or required
   PostCommitTrigger: String specifying name of post-commit method for parameter
   PreCommitTrigger: String specifying name of pre-commit method for parameter
   Settable:       Flag indicating whether parameter is settable at runtime by operator
   State:          Current state of parameter (i.e., added, downloaded, etc.)
   Structure:      Flag indicating whether or not parameter is a structured parameter
   Targetable:     Flag indicating whether or not parameter is targetable
   Unique:         Flag indicating parameter must be unique within a collection
   System:         Flag indicating whether or not parameter is for programmatic use only during
configuration
   ValueExtension: Parameter extension for that parameter -->
<!ATTLIST AtomicParameterDefinition ——345
   ArrayDepth CDATA "1" ——394         ——392
   DataType (OPCODE | INTEGER | REAL | LONG_REAL | STRING | BOOL | LONG_INT |
SHORT_INT | PACK_BOOL | PACK_LONG | HANDLE | RANGE_DEF | DEV | ANY)
#REQUIRED
   Connectability (Source | SourceAndSink | None) #REQUIRED
   Security CDATA #REQUIRED
   DefaultValue CDATA #REQUIRED
   LowRange CDATA #IMPLIED
   HighRange CDATA #IMPLIED
   Configurable (Yes | No | Once) "No"
   Label CDATA "No label"
   Description CDATA "No description"
   Private (Yes | No) "No"
   Definition CDATA #IMPLIED
   Units CDATA #IMPLIED
   Groups CDATA #IMPLIED
   Tooltip CDATA #IMPLIED
   Visible (Yes | No) "No"
   Choicelist CDATA #IMPLIED
   Editcontrol CDATA #IMPLIED
   Label CDATA #IMPLIED
   Format CDATA #IMPLIED
```

```
CaseConversion (Upper | Lower | None) "None"
   VersionDeleted CDATA #IMPLIED
   VersionAdded CDATA #IMPLIED
   ValueFormula CDATA #IMPLIED
   Array (Yes | No) "No"
   BackCon (Yes | No) "No"
   HelpString CDATA #IMPLIED
   Hidden (Yes | No) "No"
   Optional (Yes | No) "No"
   PostCommitTrigger CDATA #IMPLIED
   PreCommitTrigger CDATA #IMPLIED
   Settable (Yes | No) "Yes"
   State (Yes | No) "No"
   Structure (Yes | No) "No"
   Targetable (Yes | No) "Yes"
   Unique (Yes | No) "No"
   System (Yes | No) "No"
   ValueExtension CDATA #IMPLIED
>                              /—350
<!--Array Definition Element (child of Parameter Definition)-->
<!ELEMENT ArrayDefinition (ParameterDefinition)>
<!--Name:  The Name of the array.-->
<!--LowIndex: Size of the low index of the array -->
<!--HighIndex:  Size of the high index of the array-->
<!ATTLIST ArrayDefinition ——355
   LowIndex CDATA "0"
   HighIndex CDATA "1"
   Name CDATA #REQUIRED
>                              /—360
<!--Structure Definition Element (child of Parameter Definition)-->
<!ELEMENT StructureDefinition (StructureElementIdentifier* | ParameterDefinition*)>
<!--Name: The Name of the structure.-->
<!ATTLIST StructureDefinition ——365
   StructName CDATA #REQUIRED
>
<!--Structure Element Identifier (child of Structure Definition)-->
<!ELEMENT StructureElementIdentifier EMPTY>
<!ATTLIST StructureElementIdentifier
   ElementName CDATA #REQUIRED
>
```

FIG. 3C

SYSTEMS AND METHODS FOR STORING CONFIGURATION DATA IN PROCESS CONTROL SYSTEMS

BACKGROUND

A process control system can include data processing devices, control processors, input/output (I/O) modules, and process devices, such as sensors, transmitters, and valves. In a process control system, a data processing device can provide configuration data for a process to a control processor. The configuration data identifies devices to be controlled by the control processor to perform the process, relationships between the devices, and drivers and other parameters of the devices. Based on the configuration data, the control processor can provide control data to the controlled devices to perform the process.

Some process control systems store configuration data in the form of images. In such systems, changes cannot be made to stored configuration data without materially affecting the integrity of the images. Such systems can lack efficiency in their storage of configuration data, thereby inhibiting their utility.

SUMMARY

Methods for storing configuration data for a Fieldbus device in a process control system are described. In one embodiment, the methods can include generating first documents based on a first document type definition in a markup language, and generating second documents based on a second document type definition in the markup language. The first documents can include block identifiers for identifying function blocks associated with the device. The second documents can include parameter identifiers for identifying parameters associated with the function blocks.

The markup language can include a markup language capable of defining unique document tags for identifying an organization and a content of a document. The markup language can include a Standard Generalized Markup Language (SGML), such as the Extensible Markup Language (XML).

A block identifier can include data based on one or more of a name, a version, a header, a function, and a validate function of a function block, and a parameter identifier can include data based on one or more of a name of a parameter and a configuration order of the parameter in a function block.

The first documents can further include data based on one or more of a name and a version of the Fieldbus device.

The second documents can further include data based on one or more of a name of the function block, a version of the function block, a header of the function block, a type of control device associated with the Fieldbus device, a memory usage of the function block for the type of control device, an execution time of the function block for the type of control device, and a type of the function block. The type of function block can include one or more of analog, discrete, and sequential.

In one aspect, generating the first documents can include generating one first document for each different operating version of the Fieldbus device.

In one aspect, generating the second documents can include generating one second document for each different function block associated with the Fieldbus device.

In one aspect, generating the second documents can include generating one second document for each different version of each different function block associated with the Fieldbus device.

In one aspect, the second documents can further include parameter indicators for indicating data structures and data values associated with the parameters. A parameter indicator can include data based on one or more of a name of the parameter, a configuration order of the parameter in a function block, a data structure of the parameter, a data type of the parameter, and a value of the parameter. The data type can include one of Boolean, integer, real, and string. The data structure can include one of arrayed and non-arrayed.

In one embodiment, the methods can further include generating third documents based on a third document type definition in the markup language. The third documents can include parameter indicators for indicating data structures and data values associated with parameters.

In one embodiment, the methods can further include storing the first and second documents and modifying the configuration data included in the stored first and second documents. Modifying can include modifying the function blocks associated with the Fieldbus device, the parameters associated with the function blocks, and the data structures and data values of the one or more parameters during operation of the Fieldbus device.

In one embodiment, the methods can further include generating control instructions to control the Fieldbus device based on the configuration data included in the first and second documents. Generating the control instructions can include generating the control instructions using a translation engine based on the translation language. Generating the control instructions can include generating third documents based on the first and second document type definitions and the first and second documents. The third documents can include data based on the function blocks associated with the Fieldbus device, the parameters associated with the function blocks, and the data structures and data values of the parameters. In one aspect, generating control instructions can further include generating translation instructions based on a translation language for converting the third documents to control instructions and generating the control instructions based on the translation instructions and the third documents. The translation language can include an Extensible Stylesheet Language (XSL).

In one embodiment, the methods can further include restoring the Fieldbus device to a prior configuration based on providing the control instructions to the Fieldbus device.

Processor programs for storing configuration data for a Fieldbus device in a process control system are also described. The processor programs can be stored on a processor-readable medium. In one embodiment, the processor programs can include instructions to cause a processor to: generate first documents based on a first document type definition in a markup language, and generate second documents based on a second document type definition in the markup language. The first documents can include block identifiers for identifying function blocks associated with the device. The second documents can include parameter identifiers for identifying parameters associated with the function blocks.

Systems for storing configuration data for a Fieldbus device in a process control system are also described. In one embodiment, the system can include first and second document type definitions in a markup language and a data processing device in communication with the first and second document type definitions and capable of generating first documents based on the first document type definition and generating second documents based on the second document type definition. The first documents can include block identifiers for identifying function blocks associated with the device. The second documents can include parameter identifiers for identifying parameters associated with the function blocks.

These and other features of the described systems and methods can be more fully understood by referring to the following detailed description and accompanying drawings.

BRIEF DESCRIPTION OF THE DRAWINGS

FIGS. 1–3C schematically illustrate exemplary document type definitions in a markup language for storing configuration data for a process control system.

DETAILED DESCRIPTION

Generally, the described systems and methods relate to storing configuration data for control processors of process control systems. The configuration data for a control processor identifies devices to be controlled by the control processor to perform a process, relationships between the devices, and drivers and other parameters of the devices. The devices can include I/O modules and/or process devices, such as sensors, transmitters, and valves. The described systems and methods store configuration data in documents that are generated based on one or more document type definitions that are represented using a markup language. The documents store the data values and the accompanying data structures of the configuration data independently of each other.

Figure 7:
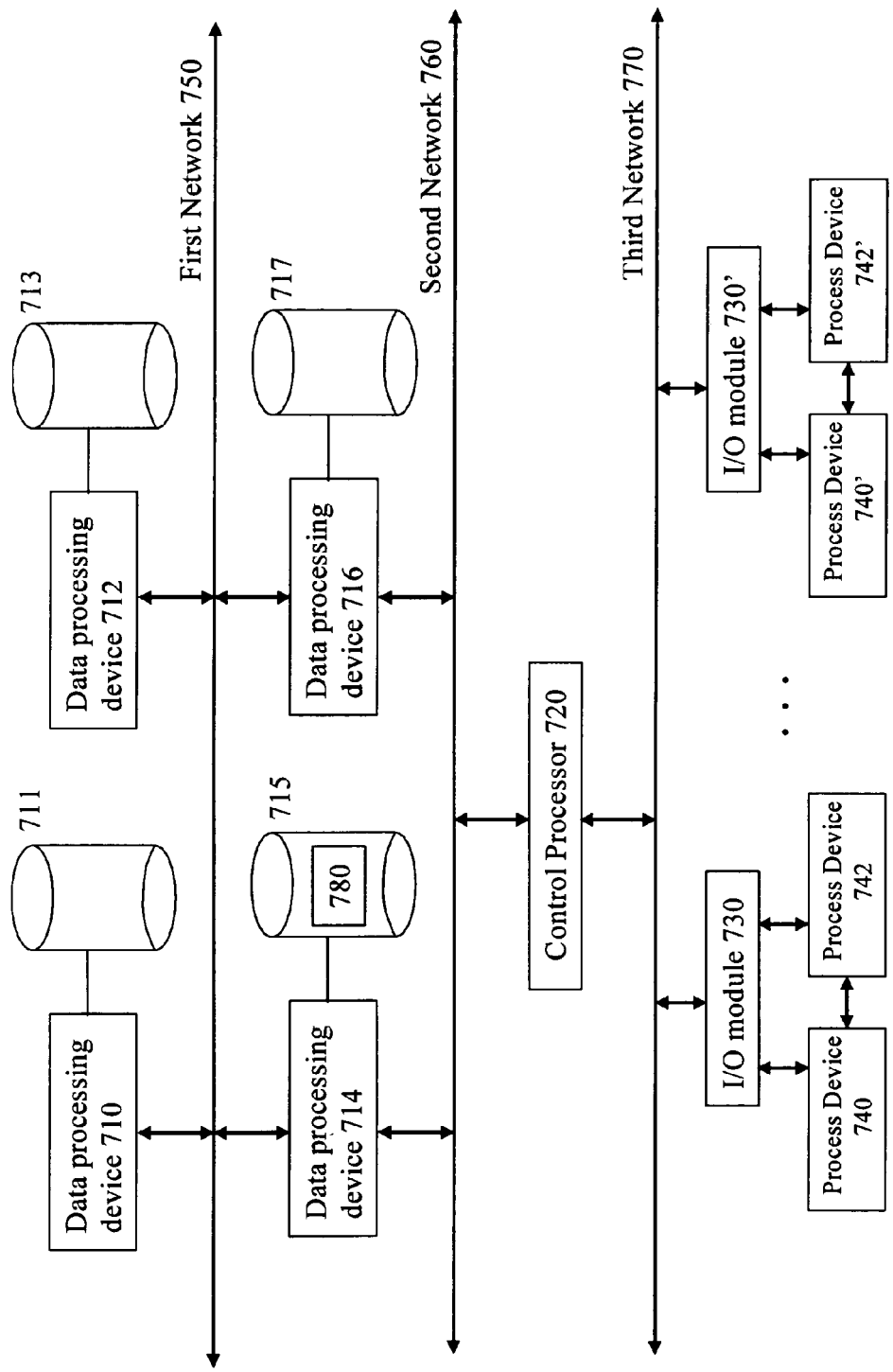
FIG. 7 schematically illustrates a process control system.

FIG. 7 schematically illustrates a process control system. As shown in the embodiment of FIG. 7, the process control system 700 includes data processing devices 710, 712, 714, 716, data storage devices 711, 713, 715, 717 associated with the data processing devices 710, 712, 714, 716, a control processor 720, input/output modules ("I/O modules") 730, and process devices 740, 742. The data processing devices 710, 712, 714, 716 can exchange data with each other over a first data communications network ("first network") 750. As shown in FIG. 7, data processing devices 714, 716 can exchange data with the control processor 720 over a second data communications network ("second network") 760, and the control processor 720 can exchange data with the I/O modules 730 and process devices 740, 742 over a third data communications network ("third network") 770. One or more of the data processing devices 710, 712, 714, 716 can store configuration data for control processor 720 in the data storage devices 711, 713, 715, 717. For example, data processing device 714 can store configuration data 780 for control processor 720 in data storage device 715. The configuration data 780 can identify I/O modules, sensors, and/or valves to be controlled by the control processor, relationships between the controlled devices, and drivers and other parameters of the controlled devices.

In one embodiment, the process control system 700 shown in FIG. 7 can include features of an I/A SERIES® System provided by Invensys Systems, Inc. As known by those of ordinary skill in the art, the I/A SERIES® System can include process devices 740, 742 based on the Foundation Fieldbus protocol, I/O modules 730 such as the I/A SERIES® FBM44 modules, a control processor 720 such as the I/A SERIES® CP40B control processor, and workstations 710, 712, 714, 716 such as the I/A SERIES® AW51E workstations. In such an embodiment, the first network 750 can include an Ethernet network, the second network 760 can include an I/A SERIES® Nodebus network that is compatible with the Ethernet network 750, and the third network 770 can include a Foundation Fieldbus network. The process devices 740, 742 can include Fieldbus devices such as sensors, valves, and transmitters. The transmitters can transmit data from the sensors and the valves to the I/O modules 730, and the I/O modules 730 can convert, translate, or otherwise transfer the data from the sensors and the valves to the control processor 720. The control processor 720 can include one or more processors and instructions operable to cause the one or more processors to implement control processes. The control processor 720 can be configured to transfer control data to the sensors and/or valves 740, 742 via the I/O modules 730 to achieve one or more control objectives. In one embodiment, the control processor 720 can be pre-programmed based on a multi-variable control system, such as the CONNISSEUR® System provided by Invensys Systems, Inc. Alternatively and/or in combination, in some embodiments, one or more process control system adjustments can be made manually via the workstations 710, 712, 714, 716. The workstations 710, 712, 714, 716 can access one or more data storage devices 711, 713, 715, 717 and can present and/or otherwise display data to one or more entities (such as system administrators) to observe and/or modify features of the system 700. In some embodiments, one or more of the workstations 710, 712, 714, 716 can be included in one or more local area networks ("LANs"). For example, with reference to FIG. 7, in one such embodiment, workstations 710, 712 and data storage devices 711, 712 can form or otherwise be included in a first LAN, and workstations 714, 716 and data storage devices 715, 717 can form or otherwise be included in a second LAN. The first and/or second LANs can include publicly accessible and/or private, i.e., non-publicly-accessible, LANs. The first LAN can be based on Ethernet, and the second LAN can be based on Nodebus. In such an embodiment, the workstations 710, 712, 714, 716 can communicate with one or more different networks via one or more intranets and/or one or more internets.

Exemplary embodiments of the disclosed systems and methods will now be described with respect to storing configuration data for control processors in the Invensys I/A SERIES® System shown in FIG. 7. Those of ordinary skill in the art will understand that the embodiments should be interpreted in an illustrative manner and that the disclosed systems and methods are not limited to storing configuration data for control processors in the Invensys I/A SERIES® System.

As previously described, configuration data for a control processor identifies devices to be controlled by the control processor to perform a process, relationships between the devices, and drivers and other parameters of the devices. In the Invensys I/A SERIES® System, control processors control I/O modules and Fieldbus devices such as sensors, transmitters, and valves. Invensys I/A SERIES® I/O modules are associated with drivers referred to as equipment control blocks (ECBs), and Fieldbus devices are associated with drivers commonly referred to as function blocks. Each ECB and function block is associated with one or more parameters, and each parameter is associated with a data value and an accompanying data structure. In the Invensys I/A SERIES® System, the configuration data for a control processor includes at least data that identifies the ECBs associated with the I/O modules and the function blocks associated with the Fieldbus devices to be controlled by the control processor, the parameters associated with the ECBs and the function blocks, and the data values and the accompanying data structures associated with the parameters.

In the following discussion, the exemplary embodiments of the disclosed systems and methods are described with respect to storing configuration data for Fieldbus devices associated with function blocks. Those of ordinary skill in the art will understand that schemes similar to those described herein can be used to store configuration data for I/O modules associated with ECBs and other types of devices.

The disclosed systems and methods store configuration data for control processors in documents that are generated based on document type definitions in a markup language. The markup language includes a markup language that is capable of defining unique document tags for the organization and content of a document. The markup language can include a Standardized General Markup Language (SGML), such as, but not limited to, the Extensible Markup Language (XML). The disclosed systems and methods use at least two document type definitions (DTDs) based on the markup language to generate documents for storing configuration data. Preferably, the disclosed systems and methods use three DTDs that include a control processor DTD (controller DTD), a function block parameter list DTD (block parameter list DTD), and a function block definition DTD (block definition DTD). The disclosed systems and methods can store configuration data in the form of a controller document based on the controller DTD, a block parameter list document based on the block parameter list DTD for each function block included in the controller document, and a parameter list document based on the block definition DTD. The controller document identifies the name and version of the control processor and the names and versions of the function blocks associated with the control processor. Each block parameter list document identifies the name and version of a function block associated with the control processor and included in the controller document and the names of the parameters associated with the function block. The parameter definition document identifies the parameters and parameter attributes for function blocks associated with the control processor.

Exemplary controller, block parameter list, and block definition DTDs for storing configuration data for the Invensys I/A SERIES® System are shown in FIGS. 1–3C. The exemplary DTDs shown in FIGS. 1–3C are written in XML. As will be understood by those of ordinary skill in the art, markup commands having the form "<!ELEMENT . . . >" and "<!ATTLIST . . . >" represent element and attribute list definitions, respectively, while text of the form "<!—. . . —>" represent explanatory comments. Those of ordinary skill in the art will understand that the exemplary DTDs shown in FIGS. 1–3C should be interpreted in an illustrative manner and that the disclosed systems and methods can be implemented with DTDs that include different types of document tags, different organizations of content, and/or different content than the exemplary DTDs shown in FIGS. 1–3C.

FIG. 1 shows an exemplary controller DTD. As shown in FIG. 1, the exemplary controller DTD 100 uses the root element ControllerDefinition 112 to represent a control processor and the child element BlockDefinitionIdentifier 122 to represent function blocks associated with the control processor. Attributes of the control processor include the name 114 and the version 116 of the control processor, and attributes of the function blocks include the names 124, the versions 126, and, in some embodiments, the headers 128 and/or run functions "BlockFunction" 130 and/or validate functions 132 of the function block. The run functions 130 and/or validate functions 132 attributes can be used for function blocks having run functions and/or validate functions that are not defined by the names of the function blocks. The element BlockDefinitionIdentifier 122 and its attributes are used as references to BlockDefinition elements in other documents, e.g. block parameter list documents.

FIG. 2 shows an exemplary block parameter list DTD. As shown in FIG. 2, the block parameter list DTD 200 uses the root element BlockDefinition 212 to identify a function block and the child element ParameterDefinitionName 232 to identify parameters associated with the function block. Attributes of the function block include the name "TypeName" 214, version 216, and, in some embodiments, the header 218 and type "ObjectType" 220 of the function block. The name 214 and version 216 attributes correspond to the name 124 and version 126 attributes of a function block (as represented by a BlockDefinitionIdentifier element 122) in a controller document. The type 220 of the function block can include one of I/A SERIES® and sequential and one of analog and discrete, as those terms are understood by one of ordinary skill in the art. Attributes of the parameters associated with the function block include the names and the configuration orders of the parameters in the function block. The element ParameterDefinitionName 232 and its attributes are used as references to ParameterDefinition elements in other documents, e.g. parameter definition documents.

In some embodiments, the block parameter list DTD 200 can use the child element CPLoadInfo 240 to identify features associated with loading of a function block in a control processor. For example, as shown in FIG. 2, features associated with the loading of a function block can include a type "CPType" 242 of control processor associated with the function block, a memory usage 244 of the function block in the specified type of controller, and an execution time 246 of the function block in the specified type of controller.

FIGS. 3A–3C show an exemplary block definition DTD. As shown in FIG. 3A, the block definition DTD 300 uses the root element BlockDefinition 312 to identify a function block and the child element ParameterDefinition 332 to identify parameters associated with the function block. Attributes of the function block can include attributes similar to those described and shown with respect to the block parameter list DTD 200 of FIG. 2. The name "TypeName" 314 and version 316 attributes of the function block correspond to the name 124 and version 126 attributes of a function block in the controller document (as represented by a BlockDefinitionIdentifier 112 element) and to the name 214 and version 216 attributes of a function block in a block parameter list document (as represented by a child element BlockDefinition 212). Attributes of the parameters include the name 334 and the configuration order 336 of the parameter in the function block. These attributes correspond to the name 234 and order 236 attributes of a parameter in a block parameter list document (as represented by a ParameterDefinitionName 232 element). The exemplary block definition DTD 300 uses child elements of ParameterDefinition 332 and their attributes to identify data values and data structures of parameters associated with a function block. As shown in FIGS. 3A–3C, the child elements AtomicParameterDefinition 340, ArrayDefinition 350, and StructureDefinition 360 and their attributes 345, 355, 365 identify data structures and data values of the parameters. For example, the attributes of a parameter can include a parameter data type 392 and a parameter data structure 394. The parameter data type can include one of Boolean, integer, real, and string, and the parameter data structure can include one of arrayed and non-arrayed.

Figure 4:
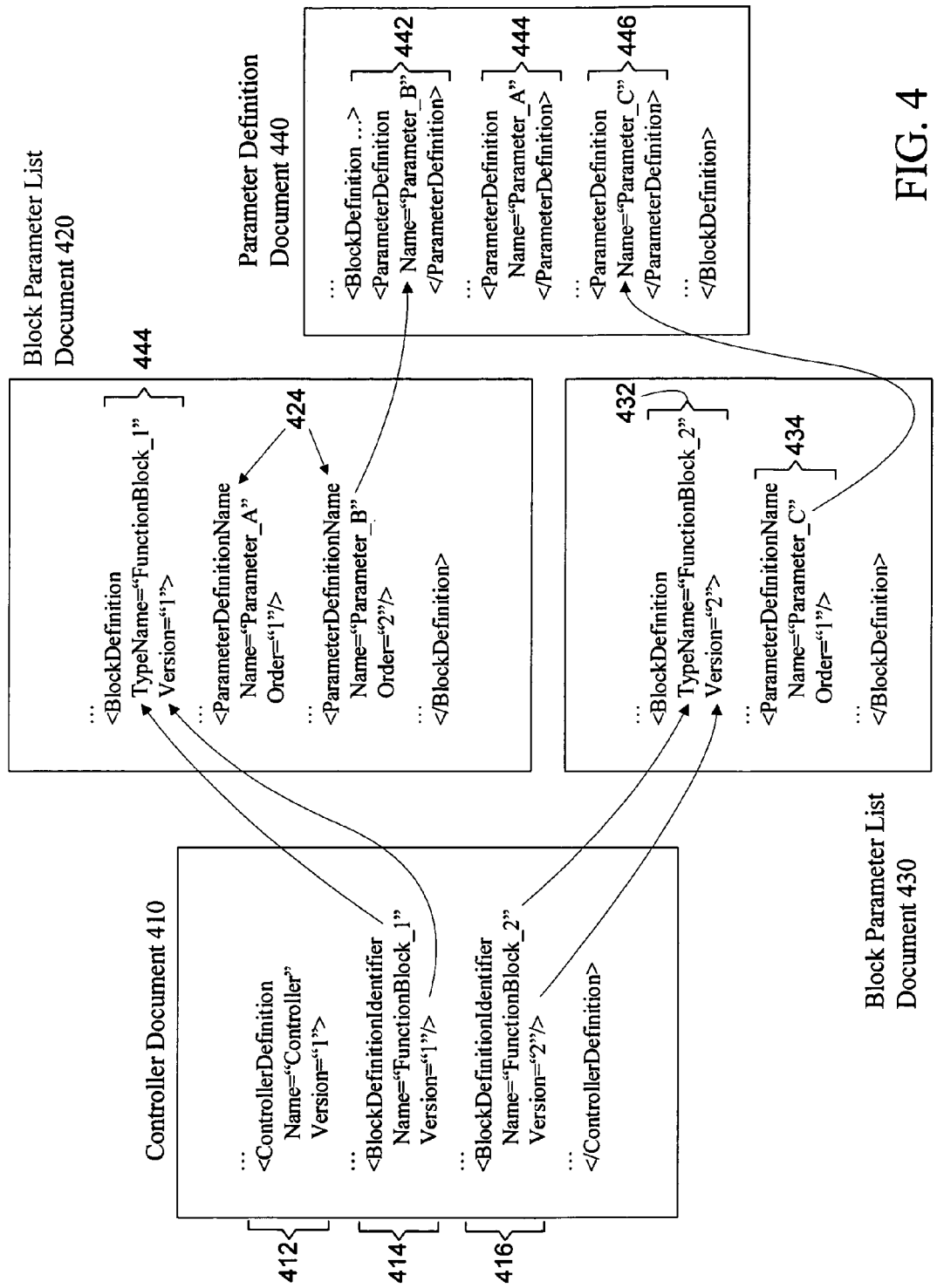
FIG. 4 schematically illustrates exemplary documents in a markup language for storing configuration data for a process control system.

Features of exemplary controller, block parameter list, and parameter definition documents for storing configuration data for the Invensys I/A SERIES® System are shown in FIG. 4. The portions of documents shown in FIG. 4 are written in XML. Those of ordinary skill in the art will understand that the exemplary documents shown in FIG. 4 should be interpreted in an illustrative manner and that the disclosed systems and methods can use documents different than those shown in FIG. 4 to store configuration data.

As shown in FIG. 4, controller XML document 410 includes tags 412 that identify the controller name as CP40 and the controller version as 1 and tags 414, 416 that identify function block 1, version 1 and function block 2, version 2 as the function blocks associated with controller CP40, version 1. Block parameter list XML documents 420, 430 include tags 422, 432 that identify the names of the function blocks included in the controller XML document 410 and tags 424, 434 that identify the names of the parameters associated with the function blocks. For example, as shown in FIG. 4, the block parameter list XML documents 420, 430 are associated with the function blocks of the controller XML document 410 based on the correspondence of the name and version attributes of the BlockDefinitionIdentifier elements 414, 416 in the controller XML document 410 and the typename and version attributes of the BlockDefinition elements 422, 432 in the block parameter list XML documents 420, 430. Parameter definition XML document 440 includes tags 442, 444, 446 that identify the parameters, the parameter values, and the parameter data structures associated with the function blocks included in the controller XML document 410. As shown in FIG. 4, the parameters of the parameter definition XML document 440 are associated with the function blocks of the block parameter list XML documents 420, 430 based on the correspondence of the name attribute of the ParameterDefinition element 442, 444, 446 in the parameter definition XML document 440 and the name attribute of the ParameterDefintionName element 424, 434 in the block parameter list XML documents 420, 430.

The described systems and methods can generate different controller documents for different combinations of controller name and controller version and/or different block parameter list documents for different combinations of function block name and function block version. For example, in some embodiments, the described systems and methods can generate different controller documents for different operating versions of the same controller and/or different block parameter list documents for different operating versions of the same function block.

As will be understood by those of ordinary skill in the art, different function blocks (i.e., function blocks that have different names or function blocks that have the same names and different versions) can be associated with the same set of parameters and/or different values (such as default values) of the same parameter. In some embodiments, elements of one or more of the DTDs shown in FIGS. 1–3C can be associated with additional attributes to reduce storage of redundant portions of configuration data. For example, in some embodiments, the BlockDefinitionIdentifier element 122 in the controller DTD 100 can be associated with an additional attribute referred to as DefinitionName 134. In one such embodiment, different function blocks that are associated with the same sets of parameters can be associated with the same DefinitionName 134 attribute. In such an embodiment, both of the different function blocks can be associated with a single block parameter list document (rather than two separate block parameter list documents) based on the correspondence of the DefinitionName 134 attributes of the function blocks in a controller document and the typename attribute 214 of a BlockDefinition element 212 in a block parameter list document. Also for example, in some embodiments, the ParameterDefinition element 332 in the block definition DTD 300 can be associated with an additional attribute referred to as ParamName 338. In such an embodiment, different function blocks that are associated with different values of the same parameter can be distinguished by associating the function blocks with different names for the parameter in block parameter list documents (i.e., different name attributes 234 in the block parameter list documents) and one of the parameter values with the ParamName attribute 338 in a parameter definition document. In one such embodiment, different values of the same parameter can be associated with the different function blocks based on the correspondence of the name attribute 234 of the parameter in a block parameter list document and the name 334 or ParamName 338 attribute in a parameter definition document.

As previously described, the disclosed systems and methods preferably store configuration data by using three DTDs, such as the controller, block parameter list, and block definition DTDs shown in FIGS. 1–3. By using three DTDs, the described systems and methods can reduce the storage size of the configuration data because parameters associated with more than one function block are stored only once in a parameter definition document, rather than redundantly in block parameter list documents. Alternatively, in some embodiments, the disclosed systems and methods can store configuration data by using two DTDs. For example, in one such embodiment, features of the block parameter list DTD and the block definition DTD shown in FIGS. 1 and 2 can be combined and/or otherwise rearranged into a single combined DTD.

As shown in FIG. 4, the controller, block parameter list, and parameter definition documents store data values and data structures of the configuration data for a control processor independently of each other. For example, the controller XML document 410 identifies function blocks associated with the control processor, the block parameter list XML documents 420, 430 identify parameters associated with the function blocks, and the parameter list XML document 440 identifies data values and data structures associated with the parameters of the function blocks. Since the XML documents 410, 420, 430, 440 store data values and data structures of configuration data independently of each other, changes can be made to the configuration data without materially affecting the integrity of the documents.

For example, the names of the function blocks associated with the controller, the versions of the function blocks associated with the controller, the names of the parameters associated with the function blocks, the data structures of the parameters, and/or the data values of the parameters can be modified without materially affecting the integrity of the documents. In some embodiments, the configuration data can be modified during operation of the control processor.

As previously described, the disclosed systems and methods store configuration data in documents generated based on one or more document type definitions in a markup language. Generally, instructions operable to cause control processors to implement control processes are not compatible with markup languages. In some embodiments, the disclosed systems and methods thus translate the documents using a translation engine to generate control instructions for the control processors that include the configuration data.

Figure 5:
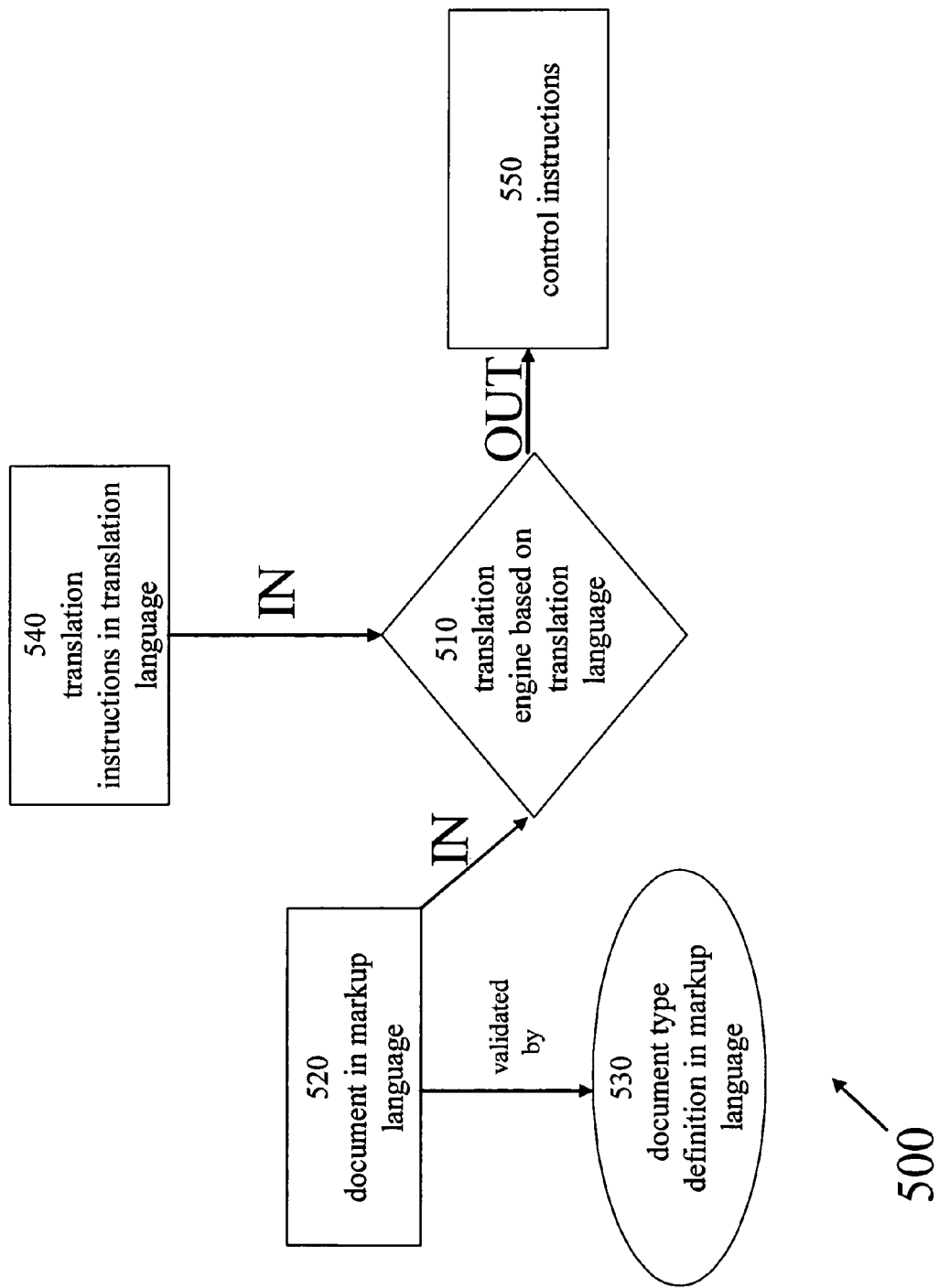
FIG. 5 schematically illustrates a scheme for generating control instructions for a process control system based on a document that stores configuration data in a markup language.

FIG. 5 schematically illustrates a scheme for generating control instructions for a control processor based on a document that stores configuration data in a markup language. As shown in FIG. 5, the general scheme 500 includes a translation engine 510 based on a translation language. In the general scheme 500, a document 520 in a markup language, a document type definition 530 in the markup language for validating the document 520, and translation instructions 540 in the translation language are provided to the translation engine 510, and the translation engine 510 generates control instructions 550 corresponding to the document 520. A variety of translation languages and engines are currently available for converting documents based on markup languages to control instructions in languages compatible with control processors. One translation language includes the Extensible Stylesheet Language (XSL), which can be used to translate XML documents into instructions for control processors based on C and other programming languages.

As previously described, the disclosed systems and methods preferably store configuration data in the form of a controller document, a block parameter list document for each function block in the controller document, and a parameter definition document. Before generating control instructions, the disclosed systems and methods generate block definition documents for each function block included in the controller document. The disclosed systems and methods generate the block definition documents based on the block definition DTD, such as the block definition DTD 300 shown in FIG. 3. Each block definition document includes the attributes of a function block, the parameters associated with that function block, and the attributes of those parameters, including their data values and accompanying data structures. The disclosed systems and methods then provide the block definition documents, the controller document, and the controller and block definition DTDs to a translation engine to generate control instructions for the control processor.

Figure 6:
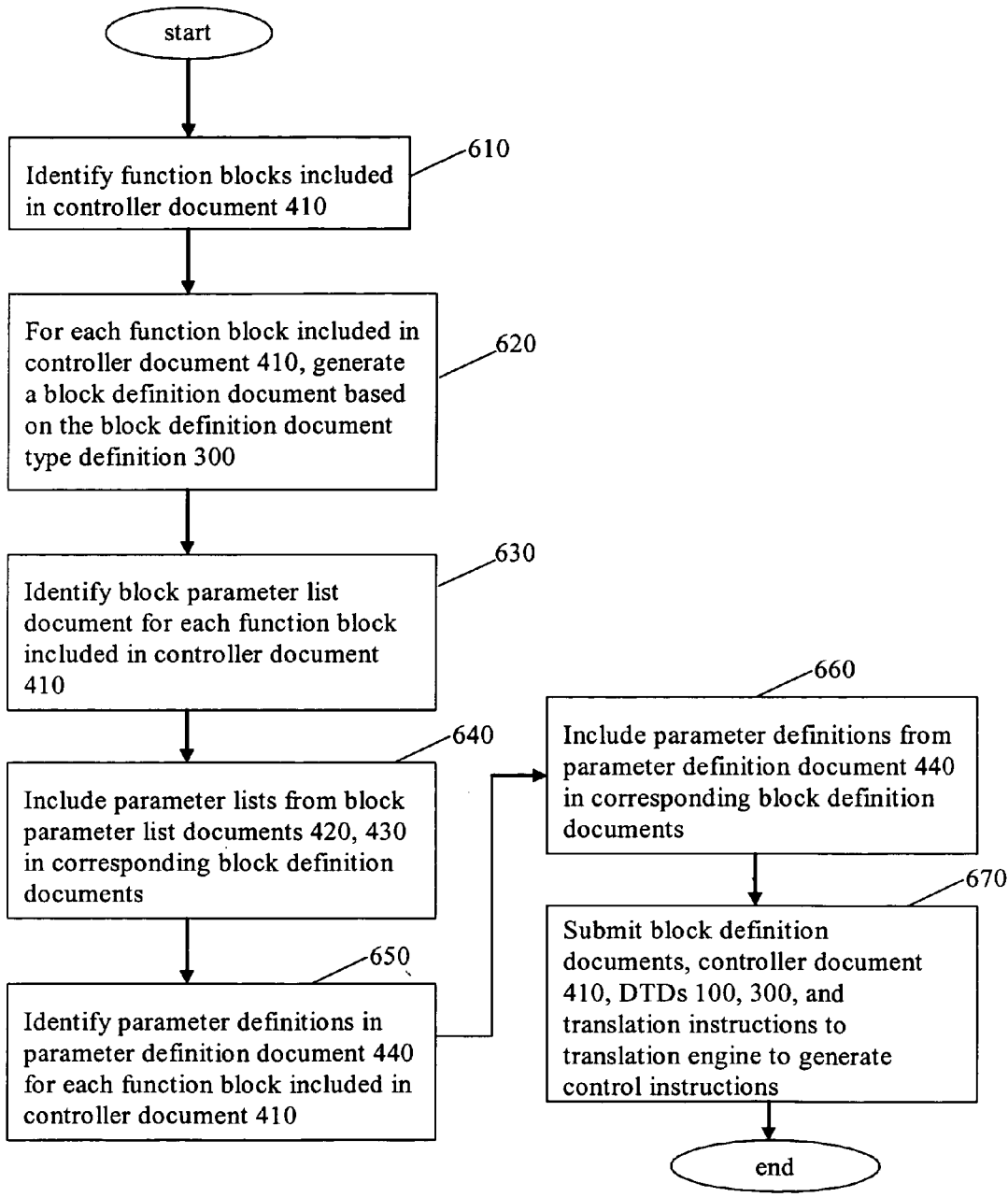
FIG. 6 schematically illustrates an exemplary scheme for generating control instructions for a process control system based on the documents shown in FIG. 4.

FIG. 6 is a flow chart that schematically illustrates generating control instructions for a control processor based on the documents shown in FIG. 4. As shown in FIG. 6, the function blocks included in the controller document 410 can be identified (610 in FIG. 6), and a block definition document based on the block definition DTD 300 can be generated for each identified function block (620 in FIG. 6). The block parameter list documents corresponding to the function blocks can be identified (630 in FIG. 6). As previously described, a block parameter list document can be identified based on a correspondence between the name and version attributes of a BlockDefinitionIdentifier element in the controller document 410 and the typename and version attributes of a BlockDefinition element in a block parameter list document 420, 430. For a function block, the parameters from the corresponding block parameter list document 420, 430 can be included in the block definition document (640 in FIG. 6). The parameter definitions (i.e., the parameter data values and the parameter data structures) for the parameters of the function blocks can be identified in the parameter list document 440 (650 in FIG. 6). As previously described, the parameter definitions can be identified based on a correspondence between the name attribute of a ParameterDefinitionName element in a block parameter list document 420, 430 and a name attribute of a ParameterDefinition element in the parameter definition document 440. For a function block, the corresponding parameters from the parameter definition document 440 can be included in the block definition document (660 in FIG. 6). The resulting block definition documents, the controller document 410, and the controller and block definition DTDs 100, 300 can be provided to a translation engine 500, and the translation engine 500 can generate control instructions 550 for a control processor that includes the configuration data (670 in FIG. 6).

As previously described, the disclosed systems and methods store configuration data in documents generated based on one or more document type definitions in a markup language. In some embodiments, the stored configuration data can be used to restore a control processor to a prior configuration, i.e., the configuration described by the configuration data.

Figure 8:
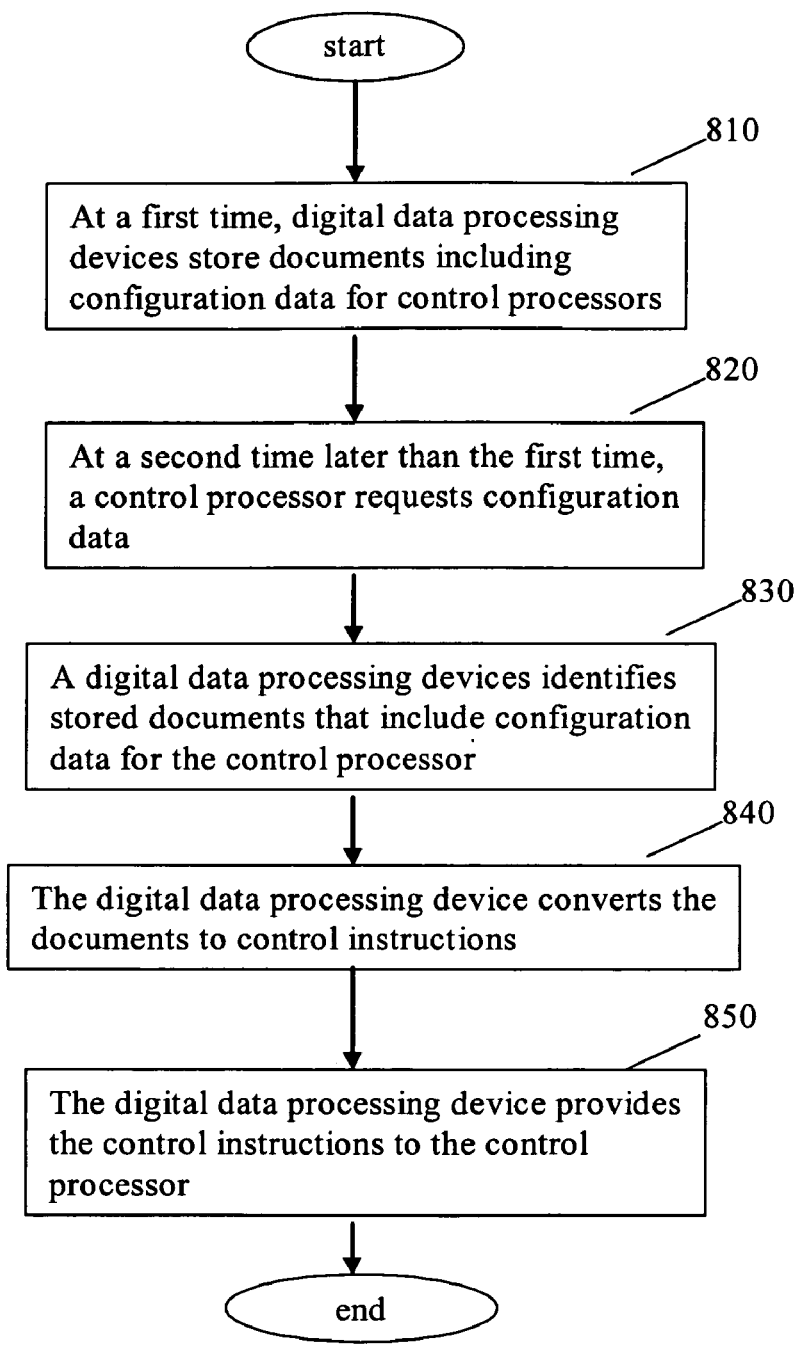
FIG. 8 schematically illustrates an exemplary method for restoring a control processor of a process control system to a prior configuration.

FIG. 8 schematically illustrates an exemplary method for restoring a control processor to a prior configuration. As will be understood by those of ordinary skill in the art, the disclosed systems and methods are not limited to restoring a control processor based on the flow elements of FIG. 8 and can restore a Fieldbus device to a prior configuration based on flow elements that are different than and/or additional to the flow elements of FIG. 8.

With reference to FIGS. 7 and 8, at a first time, one or more data processing devices (e.g., one or more of the data processing devices 710, 712, 714, 716) store configuration data for a control processor (e.g., control processor 720) in documents that are generated based on the schemes described herein (810 in FIG. 8). At a second time later than the first time, the control processor requests configuration data from one or more of the data processing devices (820 in FIG. 8). For example, the control processor 720 can request configuration data during an initialization, such as, but not limited to, an initialization after a power failure. As used herein, an initialization refers to a sequence during which a device (e.g., a Fieldbus device such as a control processor) loads, reloads, or otherwise updates one or more components of an operating system and includes sequences related to booting, rebooting, starting, and restarting. Based on the request from the control processor, one or more of the digital data processing devices identifies stored configuration data, i.e., stored documents that include configuration data, for the control processor (830 in FIG. 8). Subsequently, the one or more digital data processing devices (and/or other devices) convert the stored documents to control instructions (840 in FIG. 8) and provide the control instructions to the control processor, thus restoring the control processor to the prior configuration described by the stored documents (850 in FIG. 8).

In some embodiments, each data processing device in a process control system can store configuration data for one or more control processors and associate the stored configuration data with identifiers for the respective control processors. In some of such embodiments, a control processor in the process control system can request configuration data by transmitting a message to all of the data processing devices that includes (i) a request for configuration data and (ii) an identifier for the control processor. Based on receiving the message, the data processing device(s) that stores the configuration data for the control processor accesses the stored documents associated with the identifier for the control processor, converts them to control instructions, and provides the control instructions to the control processor.

The systems and methods described herein are not limited to a hardware or software configuration; they can find applicability in many computing or processing environments. The systems and methods can be implemented in hardware or software, or in a combination of hardware and software. The systems and methods can be implemented in one or more computer programs, in which a computer program can be understood to comprise one or more processor-executable instructions. The computer programs can execute on one or more programmable processors, and can be stored on one or more storage media readable by the processor, comprising volatile and non-volatile memory and/or storage elements.

The computer programs can be implemented in high level procedural or object oriented programming language to communicate with a computer system. The computer programs can also be implemented in assembly or machine language. The language can be compiled or interpreted. The computer programs can be stored on a storage medium or a device (e.g., compact disk (CD), digital video disk (DVD), magnetic disk, internal hard drive, external hard drive, random access memory (RAM), redundant array of independent disks (RAID), or removable memory device) that is readable by a general or special purpose programmable computer for configuring and operating the computer when the storage medium or device is read by the computer to perform the methods described herein.

Unless otherwise provided, references herein to data processing devices can be understood to be references to digital data processing devices that can include a personal computer, a computer workstation (e.g., Sun, Hewlett-Packard), a laptop computer, a mainframe computer, a server computer, a network-attached storage (NAS) device, a handheld device (e.g., a personal digital assistant, a Pocket Personal Computer (PC), a cellular telephone, etc.), an information appliance, and/or another type of generic or special-purpose, processor-controlled device capable of receiving, processing, and/or transmitting digital data. As will be understood by those of ordinary skill in the art, a processor can refer to the logic circuitry that responds to and processes instructions that drive digital data processing devices and can include, without limitation, a central processing unit, an arithmetic logic unit, an application specific integrated circuit, a task engine, and/or combinations, arrangements, or multiples thereof.

Unless otherwise provided, references herein to memory can include one or more processor-readable and accessible memory elements and/or components that can be internal to a processor-controlled device, external to a processor-controlled device, and/or can be accessed via a wired or wireless network using one or more communications protocols, and, unless otherwise provided, can be arranged to include one or more external and/or one or more internal memory devices, where such memory can be contiguous and/or partitioned based on the application.

Unless otherwise provided, references herein to a/the processor and a/the microprocessor can be understood to include one or more processors that can communicate in stand-alone and/or distributed environment(s) and can be configured to communicate via wired and/or wireless communications with one or more other processors, where such one or more processor can be configured to operate on one or more processor-controlled devices that can include similar or different devices. Use of such processor and microprocessor terminology can be understood to include a central processing unit, an arithmetic logic unit, an application-specific integrated circuit, and/or a task engine, with such examples provided for illustration and not limitation.

Unless otherwise provided, use of the articles "a" or "an" herein to modify a noun can be understood to include one or more than one of the modified noun.

While the systems and methods described herein have been shown and described with reference to the illustrated embodiments, those of ordinary skill in the art will recognize or be able to ascertain many equivalents to the embodiments described herein by using no more than routine experimentation.

For example, aspects, components, features, and/or modules of the illustrative embodiments can be combined, separated, interchanged, and/or rearranged to generate other embodiments.

Also for example, the disclosed systems and methods can store configuration data for control processors that control devices based on different types of protocols and/or different types of process control systems than that shown in FIG. 7.

Also for example, the disclosed systems and methods can store configuration data for different types of devices, such as control processors, I/O modules, and process devices.

Such equivalents are encompassed by the scope of the present disclosure and the appended claims. Accordingly, the systems and methods described herein are not to be limited to the embodiments described herein, can include practices other than those described, and are to be interpreted as broadly as allowed under prevailing law.

The invention claimed is:

1. A method of storing configuration data for a Fieldbus device, the method comprising:
based on a first document type definition in a markup language, generating one or more first documents including one or more block identifiers for identifying one or more function blocks associated with the Fieldbus device, and
based on a second document type definition in the markup language, generating one or more second documents associated with the one or more function blocks, the one or more second documents including one or more parameter identifiers for identifying one or more parameters associated with the one or more function blocks.

2. The method of claim 1, wherein the markup language includes a markup language capable of defining one or more unique document tags for identifying one or more of an organization and a content of a document.

3. The method of claim 1, wherein the one or more first documents further include data based on one or more of: a name and a version of the Fieldbus device.

4. The method of claim 1, wherein a block identifier includes data based on one or more of: a name, a version, a header, a function, and a validate function of a function block.

5. The method of claim 1, wherein the one or more second documents further include data based on one or more of: a name, a version, and a header of the function block.

6. The method of claim 1, wherein the one or more second documents further include data based on one or more of:
a type of control device associated with the Fieldbus device,
a memory usage of the function block for the type of control device,
an execution time of the function block for the type of control device, and
a type of the function block.

7. The method of claim 6, wherein the type of function block includes analog.

8. The method of claim 6, wherein the type of function block includes discrete.

9. The method of claim 1, wherein a parameter identifier includes data based on one or more of: a name of a parameter and a configuration order of the parameter in a function block.

10. The method of claim 1, wherein generating one or more first documents includes:
generating one first document for each different operating version of the Fieldbus device.

11. The method of claim 1, wherein generating one or more second documents includes:
generating one second document for each different function block associated with the Fieldbus device.

12. The method of claim 1, wherein generating one or more second documents includes:
generating one second document for each different version of each different function block associated with the Fieldbus device.

13. The method of claim 1, wherein the one or more second documents further include one or more parameter indicators for indicating data structures and data values associated with the one or more parameters.

14. The method of claim 13, wherein a parameter indicator includes data based on one or more of:
a name of the parameter,
a configuration order of the parameter in a function block,
a data structure of the parameter,
a data type of the parameter,
a value of the parameter.

15. The method of claim 14, wherein the data type includes one of: Boolean, integer, real, and string.

16. The method of claim 14, wherein the data structure include one of: arrayed and non-arrayed.

17. The method of claim 1, further comprising:
based on a third document type definition in the markup language, generating one or more third documents including one or more parameter indicators for indicating data structures and data values associated with the one or more parameters.

18. The method of claim 1, further comprising:
storing the one or more first and the one or more second documents.

19. The method of claim 18, further comprising:
modifying the configuration data included in one or more of the stored documents.

20. The method of claim 18, wherein modifying includes: modifying one or more of:
the one or more function blocks associated with the Fieldbus device,
the one or more parameters associated with the one or more function blocks, and
the data structures and data values of the one or more parameters during operation of the Fieldbus device.

21. The method of claim 1, further comprising:
based on the configuration data included in the one or more first documents and the one or more second documents, generating control instructions to control the Fieldbus device.

22. The method of claim 21, wherein generating control instructions to control the Fieldbus device includes:
based on the first and second document type definitions and the one or more first and second documents, generating one or more third documents including data based on
the one or more function blocks associated with the Fieldbus device,
the one or more parameters associated with the one or more function blocks, and
the data structures and data values of the one or more parameters.

23. The method of claim 22, wherein generating control instructions further includes:
based on a translation language, generating translation instructions for converting the one or more third documents to control instructions, and
based on the translation instructions and the one or more third documents, generating the control instructions.

24. The method of claim 23, wherein the translation language includes an Extensible Stylesheet Language (XSL).

25. The method of claim 23, wherein generating the control instructions includes:
generating the control instructions using a translation engine based on the translation language.

26. The method of claim 21, further comprising:
restoring the Fieldbus device to a prior configuration based on providing the control instructions to the Fieldbus device.

27. The method of claim 1, wherein the markup language includes one or more of: a Standard Generalized Markup Language (SGML) and an Extensible Markup Language (XML).

28. The method of claim 1, wherein the Fieldbus device includes one or more of: a processor, an input/output module, a sensor, a valve, and a transmitter.

29. A processor program for storing configuration data for a Fieldbus device, the processor program being stored on a processor-readable medium and including instructions to cause a processor to:
based on a first document type definition in a markup language, generate one or more first documents including one or more block identifiers for identifying one or more function blocks associated with the Fieldbus device, and
based on a second document type definition in the markup language, generate one or more second documents associated with the one or more function blocks, the one or more second documents including one or more parameter identifiers for identifying one or more parameters associated with the one or more function blocks.

30. The processor program of claim 29, wherein a block identifier includes data based on one or more of: a name, a version, a header, a function, and a validate function of a function block.

31. The processor program of claim 29, wherein a parameter identifier includes data based on one or more of: a name of a parameter and a configuration order of the parameter in a function block.

32. The processor program of claim 29, wherein the one or more second documents further include one or more parameter indicators for indicating data structures and data values associated with the one or more parameters.

33. The processor program of claim 32, wherein a parameter indicator includes data based on one or more of:
a name of the parameter,
a configuration order of the parameter in a function block,
a data structure of the parameter,
a data type of the parameter,
a value of the parameter.

34. The processor program of claim 29, further including instructions to:
based on the configuration data included in the one or more first documents and the one or more second documents, generate control instructions to control the Fieldbus device.

35. The processor program of claim 34, wherein the instructions to generate control instructions include instructions to:
based on the first and second document type definitions and the one or more first and second documents, generate one or more third documents including data based on
the one or more function blocks associated with the Fieldbus device,
the one or more parameters associated with the one or more function blocks, and
the data structures and data values of the one or more parameters.

36. The processor program of claim 35, wherein the instructions to generate control instructions further include instructions to:
based on a translation language, generate translation instructions for converting the one or more third documents to control instructions, and
based on the translation instructions and the one or more third documents, generate the control instructions.

37. A system for storing configuration data for a Fieldbus device, the system comprising:
a first document type definition in a markup language,
a second document type definition in a markup language, and
a data processing device in communication with the first and second document type definitions and capable of:
based on the first document type definition, generating one or more first documents including one or more block identifiers for identifying one or more function blocks associated with the Fieldbus device, and
based on the second document type definition in the markup language, generating one or more second documents associated with the one or more function blocks, the one or more second documents including one or more parameter identifiers for identifying one or more parameters associated with the one or more function blocks.

38. The system of claim 37, wherein a block identifier includes data based on one or more of: a name, a version, a header, a function, and a validate function of a function block.

39. The system of claim 37, wherein a parameter identifier includes data based on one or more of: a name of a parameter and a configuration order of the parameter in a function block.

40. The system of claim 37, wherein the one or more second documents further include one or more parameter indicators for indicating data structures and data values associated with the one or more parameters.

41. The system of claim 40, wherein a parameter indicator includes data based on one or more of:
a name of the parameter,
a configuration order of the parameter in a function block,
a data structure of the parameter,
a data type of the parameter,
a value of the parameter.

42. The system of claim 37, wherein the data processing device is capable of:
based on the configuration data included in the one or more first documents and the one or more second documents, generating control instructions to control the Fieldbus device.

43. The system of claim 37, wherein the data processing device is capable of:
based on the first and second document type definitions and the one or more first and second documents, generating one or more third documents including data based on
the one or more function blocks associated with the Fieldbus device,
the one or more parameters associated with the one or more function blocks, and
the data structures and data values of the one or more parameters.

44. The system of claim 43, wherein the data processing device is capable of:
based on a translation language, generating translation instructions for converting the one or more third documents to control instructions, and
based on the translation instructions and the one or more third documents, generate the control instructions.

* * * * *